(12) United States Patent
Zhang et al.

(10) Patent No.: US 11,728,749 B2
(45) Date of Patent: Aug. 15, 2023

(54) SINGLE-STAGE ISOLATED BIDIRECTIONAL CONVERTER AND CONTROL METHOD THEREOF

(71) Applicant: Guochuang Innovation Center of Mobile Energy (Jiangsu) Co., Ltd., Suzhou (CN)

(72) Inventors: Yutan Zhang, Jiangsu (CN); Bo Liu, Jiangsu (CN); Desheng Li, Jiangsu (CN); Junyi Zheng, Jiangsu (CN); Yuming Zhang, Jiangsu (CN)

(73) Assignee: Guochuang Innovation Center of Mobile Energy (Jiangsu) Co., Ltd., Jiangsu (CN)

( * ) Notice: Subject to any disclaimer, the term of this patent is extended or adjusted under 35 U.S.C. 154(b) by 0 days.

(21) Appl. No.: 17/728,926

(22) Filed: Apr. 25, 2022

(65) Prior Publication Data

US 2022/0416673 A1    Dec. 29, 2022

(30) Foreign Application Priority Data

Jun. 24, 2021   (CN) .......................... 202110702252.9

(51) Int. Cl.
*H02M 7/219*    (2006.01)
*H02M 7/797*    (2006.01)
(Continued)

(52) U.S. Cl.
CPC ............ *H02M 7/797* (2013.01); *H02M 1/14* (2013.01); *H02M 7/219* (2013.01); *H02M 3/33573* (2021.05); *H02M 3/33584* (2013.01)

(58) Field of Classification Search
CPC ............ H02M 7/02; H02M 7/04; H02M 7/21; H02M 7/217; H02M 7/219; H02M 7/66;
(Continued)

(56) References Cited

U.S. PATENT DOCUMENTS

| 4,747,035 A | * | 5/1988 | Bobry | .................. | H02M 5/293 |
| | | | | | 315/371 |
| 10,938,309 B1 | * | 3/2021 | Malechek | ......... | H02M 3/33507 |

(Continued)

FOREIGN PATENT DOCUMENTS

CN    103259434    8/2013
EP    3101795    12/2016

OTHER PUBLICATIONS

"Search Report of Europe Counterpart Application", dated Nov. 10, 2022, p. 1-p. 6.
(Continued)

*Primary Examiner* — Gary L Laxton
(74) *Attorney, Agent, or Firm* — JCIPRNET

(57) ABSTRACT

The disclosure provides a single-stage isolated bidirectional converter and a control method thereof. The converter includes: a first full-bridge circuit unit, a half-bridge circuit unit, a second full-bridge circuit unit, a phase-shift inductor unit, a transformer and a filter capacitor. The transformer includes a first winding and a second winding, and the first winding is provided with a center tap. The center tap is connected to the first port, two ends thereof are connected to the midpoints of the two bridge arms of the first full-bridge circuit unit through the phase-shift inductor unit, and two ends of the second winding are connected to the midpoints of the two bridge arms of the second full-bridge circuit unit. Two ends of the first full-bridge circuit unit are connected to two ends of the half-bridge circuit unit; two ends of the half-bridge circuit unit are connected to two ends of the filter capacitor.

6 Claims, 9 Drawing Sheets

(51) Int. Cl.
*H02M 1/14* (2006.01)
*H02M 3/335* (2006.01)

(58) Field of Classification Search
CPC .......... H02M 7/72; H02M 7/79; H02M 7/797; H02M 1/14
See application file for complete search history.

(56) References Cited

U.S. PATENT DOCUMENTS

2018/0034359 A1* 2/2018 Chen .................... H03F 3/2173
2019/0173387 A1   6/2019 Tanaka
2020/0398686 A1  12/2020 Tang et al.

OTHER PUBLICATIONS

Zhang Chunjiang; et al., "Modeling and Controller Design of Push-Pull Bidirectional DC/DC Converter," Journal of Yanshan University, vol. 45, No. 3, with English translation thereof, May 2021, pp. 1-23.
"Office Action of China Counterpart Application" with English translation thereof, dated Aug. 20, 2021, p. 1-p. 11.
"Office Action of China Counterpart Application" with English translation thereof, dated Sep. 17, 2021, p. 1-p. 16.

* cited by examiner

SINGLE-STAGE ISOLATED BIDIRECTIONAL CONVERTER AND CONTROL METHOD THEREOF

CROSS-REFERENCE TO RELATED APPLICATION

This application claims the priority benefit of China application no. 202110702252.9, filed on Jun. 24, 2021. The entirety of the above-mentioned patent application is hereby incorporated by reference herein and made a part of this specification.

BACKGROUND

Field of the Disclosure

The disclosure relates to the technical field of power electronics, in particular to a single-stage isolated bidirectional converter and a control method of the single-stage isolated bidirectional converter.

Description of Related Art

Isolated bidirectional converters (AC/DC bidirectional converters) are power electronic devices used for power conversion. The isolated bidirectional converters can work in rectification mode and inverter mode, providing energy transmission between alternating current and direct current, and providing electrical isolation through transformers. The isolated AC/DC bidirectional converters may be used in various fields such as driving motors, charging and discharging for electric vehicle power battery, and lithium battery energy storage.

In the related art, most of the isolated AC/DC bidirectional converters adopt a two-stage structure, which consists of a one-stage bidirectional non-isolated AC/DC converter and a one-stage bidirectional isolated DC/DC converter, and a DC bus capacitor is connected in parallel between the two stages as an energy buffer unit. However, the two-stage isolated AC/DC bidirectional converter has the following disadvantages: (1) When the two-stage isolated AC/DC bidirectional converter is adopted, the power transmission between the AC port and the DC port can only be completed through two conversions, resulting in low conversion efficiency; (2) In the two-stage isolated AC/DC bidirectional converter, the bus capacitor is required as the energy buffer unit of the two-stage converter, and the required capacitance value is high, and thus aluminum electrolytic capacitors are used normally. However, aluminum electrolytic capacitors are large in size and short in service life, which causes the two-stage isolated AC/DC bidirectional converters to have a large size and short service life; (3) The bidirectional non-isolated AC/DC bidirectional converters need to adopt a boost inductor with a large inductance to reduce the current ripple, thereby reducing the electromagnetic interference conducted to the AC terminal, and reducing the power loss on the semiconductor switch tube and the inductor.

SUMMARY OF THE DISCLOSURE

The present disclosure provides a single-stage isolated bidirectional converter and a control method thereof, which only include one-stage power conversion.

The technical solution adopted in the present disclosure is as follows:

A single-stage isolated bidirectional converter includes a DC voltage port, an AC voltage port, a first full-bridge circuit unit, a half-bridge circuit unit, a second full-bridge circuit unit, a phase-shift unit, a transformer and a filter capacitor. The AC voltage port includes a first port and a second port; and the DC voltage port includes a third port and a fourth port. The transformer includes a first winding and a second winding, and the first winding is provided with a center tap. The center tap is connected with the first port, the two ends of the first winding are connected with the midpoints of two bridge arms of the first full-bridge circuit unit through the phase-shift unit respectively, and the two ends of the second winding are connected with the midpoints of the two bridge arms of the second full-bridge circuit unit respectively. The two ends of the first full-bridge circuit unit are respectively connected with the two ends of the half-bridge circuit unit; the two ends of the half-bridge circuit unit are further connected with the two ends of the filter capacitor, and the midpoint of the bridge arm of the half-bridge circuit unit is connected with the second port. The two ends of the second full-bridge circuit unit are respectively connected with the third port and the fourth port.

The first full-bridge circuit unit includes: a first switch tube and a second switch tube connected in series, the first end of the first switch tube is connected to the first end of the second switch tube, and the connection point between the first switch tube and the second switch tube is the midpoint of a bridge arm of the first full-bridge circuit unit; a third switch tube and a fourth switch tube connected in series, a first end of the third switch tube is connected with a first end of the fourth switch tube, and the connection point between the third switch tube and the fourth switch tube is the midpoint of the other bridge arm of the first full-bridge circuit unit; a second end of the third switch tube is connected to a second end of the first switch tube, and a second end of the fourth switch tube is connected to a second end of the second switch tube.

The half-bridge circuit unit includes: a fifth switch tube and a sixth switch tube connected in series, a first end of the fifth switch tube is connected to a first end of the sixth switch tube, and the connection point between the fifth switch tube and the sixth switch tube is the midpoint of the bridge arm of the half-bridge circuit unit; a second end of the fifth switch tube is connected with a second end of the third switch tube, and a second end of the six switch tube is connected to a second end of the fourth switch tube.

The phase-shift unit includes: a first phase-shift inductor, one end of the first phase-shift inductor is connected to the midpoint of one bridge arm of the first full-bridge circuit unit, and the other end of the first phase-shift inductor is connected to one end of the first winding; a second phase-shift inductor, one end of the second phase-shift inductor is connected to the midpoint of the other bridge arm of the first full-bridge circuit unit, and the other end of the second phase-shift inductor is connected to the other end of the first winding.

The second full-bridge circuit unit includes: a seventh switch tube and an eighth switch tube connected in series, a first end of the seventh switch tube is connected to a first end of the eighth switch tube, and a connection point between the seventh switch tube and the eighth switch tube is the midpoint of a bridge arm of the second full-bridge circuit unit; a ninth switch tube and a tenth switch tube connected in series, a first end of the ninth switch tube is connected to a first end of the tenth switch tube, and a connection point between the ninth switch tube and the tenth switch tube is the midpoint of the other bridge arm of the second full-bridge circuit unit; a second end of the ninth switch tube is connected to a second end of the seventh switch tube, and a second end of the tenth switch tube is connected to a second end of the eighth switch tube.

A control method of a single-stage isolated bidirectional converter includes the following steps: after a rectification or inverter control command is received, a corresponding driving signal with duty ratio of 50% is sent to the driving terminals of the first to the tenth switch tubes to control only one of the two switch tubes in the same bridge arm in the first full-bridge circuit unit to be in a conducting state, to control only one of the two switch tubes in the half-bridge circuit unit to be in a conducting state, and to control only one of the two switch tubes in the same bridge arm in the second full-bridge circuit unit to be in a conducting state, so that the single-stage isolated bidirectional converter operates in the rectification mode or the inverter mode. When the single-stage isolated bidirectional converter operates in the rectification mode, the driving signal corresponding to the first full-bridge circuit unit is precedent to the driving signal corresponding to the second full-bridge circuit unit. When the single-stage isolated bidirectional converter operates in the inverter mode, the driving signal corresponding to the first full-bridge circuit unit lags behind the driving signal corresponding to the second full-bridge circuit unit.

DESCRIPTION OF EMBODIMENTS

The technical solutions in the embodiments of the present disclosure will be clearly and completely described below with reference to the accompanying drawings in the embodiments of the present disclosure. Clearly, the described embodiments are only a part of the embodiments of the present disclosure, rather than all the embodiments. Based on the embodiments of the present disclosure, all other embodiments obtained by those of ordinary skill in the art without creative efforts shall fall within the scope to be protected by the present disclosure.

Figure 1:
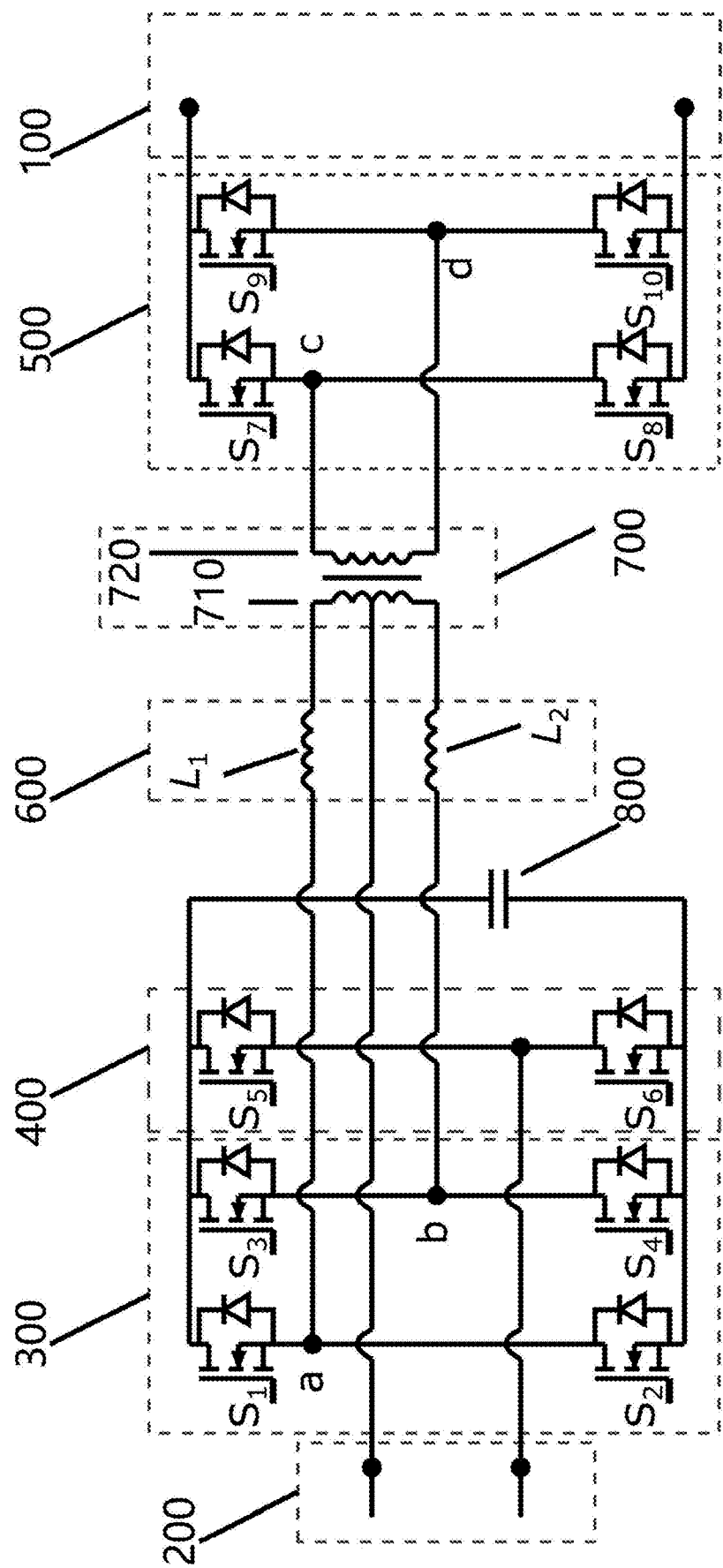
FIG. 1 is a schematic structural view of a single-stage isolated bidirectional converter according to an embodiment of the present disclosure.

FIG. 1 is a schematic structural view of a single-stage isolated bidirectional converter according to an embodiment of the present disclosure.

At present, isolated AC/DC bidirectional converters are mostly composed of a one-stage bidirectional non-isolated AC/DC converter and a one-stage bidirectional isolated DC/DC converter, and a DC bus capacitor connected in parallel between the two stages is used as an energy buffer unit. The common topologies of bidirectional non-isolated AC/DC converters are totem-pole power factor correctors, etc.; and the common topologies of bidirectional isolated DC/DC converters are CLLC resonant converters, dual active bridge converters, etc.

However, (1) When the two-stage isolated AC/DC bidirectional converter is adopted, the power transmission between the AC port and the DC port can only be completed through two conversions, resulting in low conversion efficiency; (2) In the two-stage isolated AC/DC bidirectional converter, the bus capacitor is required as the energy buffer unit of the two-stage converter, and the required capacitance value is high, and thus aluminum electrolytic capacitors are used normally. However, aluminum electrolytic capacitors are large in size and short in service life, which causes the two-stage isolated AC/DC bidirectional converters to have a large size and short service life; (3) The bidirectional non-isolated AC/DC bidirectional converters need to adopt a boost inductor with a large inductance to reduce the current ripple, thereby reducing the electromagnetic interference conducted to the AC terminal, and reducing the power loss on the semiconductor switch tube and the inductor.

Therefore, the present disclosure provides a single-stage isolated bidirectional converter, which significantly improves the conversion efficiency of the bidirectional converter, and does not need to use a bus capacitor, thus reducing the size of the bidirectional converter. Meanwhile, the single-stage isolated bidirectional converter does not need to use a boost inductor, and therefore the size of the bidirectional converter is further reduced, and the cost is lower.

Specifically, as shown in FIG. 1, the single-stage isolated bidirectional converter according to the embodiment of the present disclosure may include: a DC voltage port 100, an AC voltage port 200, a first full-bridge circuit unit 300, a half-bridge circuit unit 400, a second full-bridge circuit unit 500, a phase-shift unit 600, a transformer 700 and a filter capacitor 800.

The AC voltage port 200 includes a first port and a second port. The DC voltage port 100 includes a third port and a fourth port. The transformer 700 includes a first winding 710 and a second winding 720, and the first winding 710 is provided with a center tap. The center tap is connected to the first port. The two ends of the first winding 710 are respectively connected to the midpoints of the two bridge arms of the first full-bridge circuit unit 300 through the phase-shift unit 600. The two ends of the second winding 720 are respectively connected to the midpoints of the two bridge arms of the second full-bridge circuit unit 500. The two ends of the first full-bridge circuit unit 300 are respectively connected to the two ends of the half-bridge circuit unit 400. The two ends of the half-bridge circuit unit 400 are also connected to the two ends of the filter capacitor 800, and the filter capacitor is a high-frequency filter capacitor, configured for filtering the current ripple of the switching frequency. The midpoint of the bridge arm of the half-bridge circuit unit 400 is connected to the second port. The two ends of the second full-bridge circuit unit 500 are respectively connected to the third port and the fourth port.

According to an embodiment of the present disclosure, as shown in FIG. 1, the first full-bridge circuit unit 300 includes: a first switch tube $S_1$ and a second switch tube $S_2$ connected in series, the first end of the first switch tube $S_1$ is connected to the first end of the second switch tube $S_2$, and the connection point a between the first switch tube $S_1$ and the second switch tube $S_2$ is the midpoint of a bridge arm of the first full-bridge circuit unit 300; a third switch tube $S_3$ and a fourth switch tube $S_4$ connected in series, a first end of the third switch tube $S_3$ is connected with a first end of the fourth switch tube $S_4$, and the connection point b between the third switch tube $S_3$ and the fourth switch tube $S_4$ is the midpoint of the other bridge arm of the first full-bridge circuit unit 300; a second end of the third switch tube $S_3$ is connected to a second end of the first switch tube $S_1$, and a second end of the fourth switch tube $S_4$ is connected to a second end of the second switch tube $S_2$.

According to an embodiment of the present disclosure, as shown in FIG. 1, the half-bridge circuit unit 400 includes: a fifth switch tube $S_5$ and a sixth switch tube $S_6$ connected in series, a first end of the fifth switch tube $S_5$ is connected to a first end of the sixth switch tube $S_6$, and the connection point between the fifth switch tube $S_5$ and the sixth switch tube $S_6$ is the midpoint of the bridge arm of the half-bridge circuit unit 400; a second end of the fifth switch tube $S_5$ is connected with a second end of the third switch tube $S_3$, and a second end of the six switch tube $S_6$ is connected to a second end of the fourth switch tube $S_4$.

According to an embodiment of the present disclosure, as shown in FIG. 1, the phase-shift unit 600 includes: a first phase-shift inductor L1, one end of the first phase-shift inductor L1 is connected to the midpoint (i.e., the connection point a) of one bridge arm of the first full-bridge circuit unit 300, and the other end of the first phase-shift inductor L1 is connected to one end of the first winding 710; a second phase-shift inductor L2, one end of the second phase-shift inductor L2 is connected to the midpoint (i.e., the connection point b) of the other bridge arm of the first full-bridge circuit unit 300, and the other end of the second phase-shift inductor L2 is connected to the other end of the first winding 710.

The inductances of the first phase-shift inductor L1 and the second phase-shift inductor L2 are the same, and there may be no coupling relationship or there may be a coupling relationship between them. If there is no coupling relationship between the first phase-shift inductor L1 and the second phase-shift inductor L2, the inductance of the first phase-shift inductor L1 and the second phase-shift inductor L2 may be denoted as $L_p$; if there is a coupling relationship between the first phase-shift inductor L1 and the second phase-shift inductor L2, the differential mode inductance may be denoted as $L_{p,dm}$, and the common mode inductance may be denoted as $L_{p,cm}$. The coils of the first phase-shift inductor L1 and the second phase-shift inductor L2 may be respectively wound on two magnetic posts of a magnetic core, or may be wound on two magnetic cores respectively, and may further be used as a leakage inductance winding on the magnetic core of the transformer 700.

According to an embodiment of the disclosure, as shown in FIG. 1, the second full-bridge circuit unit 500 includes: a seventh switch tube $S_7$ and an eighth switch tube $S_8$ connected in series, a first end of the seventh switch tube $S_7$ is connected to a first end of the eighth switch tube $S_8$, and a connection point c between the seventh switch tube $S_7$ and the eighth switch tube $S_8$ is the midpoint of a bridge arm of the second full-bridge circuit unit 500; a ninth switch tube $S_9$ and a tenth switch tube $S_{10}$ connected in series, a first end of the ninth switch tube $S_9$ is connected to a first end of the tenth switch tube $S_{10}$, and a connection point d between the ninth switch tube $S_9$ and the tenth switch tube $S_{10}$ is the midpoint of the other bridge arm of the second full-bridge circuit unit 500; a second end of the ninth switch tube $S_9$ is connected to a second end of the seventh switch tube $S_7$, and a second end of the tenth switch tube Sip is connected to a second end of the eighth switch tube $S_8$.

In order to make the single-stage isolated bidirectional converter in the embodiments of the present disclosure more comprehensible to those skilled in the art, the operation mode of the single-stage isolated bidirectional converter will be described in detail below with reference to specific embodiments.

Specifically, by inputting driving signals to the driving terminals of the first to fourth switch tubes $S_1$ to $S_4$, the first to fourth switch tubes $S_1$ to $S_4$ are controlled to be turned on or off, thereby controlling the first full-bridge circuit unit 300 to operate in the following two modes:

Mode 1: When the first switch tube $S_1$ and the fourth switch tube $S_4$ are in a conducting state, the second switch tube $S_2$ and the third switch tube $S_3$ are in an off state. Mode 2: When the second switch tube $S_2$ and the third switch tube $S_3$ are in a conducting state, the first switch tube $S_1$ and the fourth switch tube $S_4$ are in an off state.

The duty ratios of the driving signals of the first to fourth switch tubes $S_1$ to $S_4$ are 50%, and only one of the two switch tubes of the same bridge arm is in a conducting state. In each switch cycle $T_s$, mode 1 and mode 2 are respectively executed once, and the durations of mode 1 and mode 2 each account for 50%.

By inputting driving signals to the driving terminals of the fifth switch tube $S_5$ and the sixth switch tube $S_6$ to control the fifth switch tube $S_5$ and the sixth switch tube $S_6$ to be turned on or off, the half-bridge circuit unit 400 is controlled to operate in the following manner:

If the single-stage isolated bidirectional converter operates in the rectification mode, when the AC terminal voltage $V_g$ is positive, the sixth switch tube $S_6$ is in the on state or the off state, and the fifth switch tube $S_5$ is in the off state. When the AC terminal voltage $V_g$ is negative, the fifth switch tube $S_5$ is in the on state or the off state, and the sixth switch tube $S_6$ is in the off state. If the single-stage isolated bidirectional converter operates in the inverter mode, when the AC terminal voltage $V_g$ is positive, the fifth switch tube $S_5$ is in the on state, and the sixth switch tube $S_6$ is in the off state. When the AC terminal voltage $V_g$ is negative, the sixth switch tube $S_6$ is in the on state, and the fifth switch tube $S_5$ is in the off state.

By inputting driving signals to the driving terminals of the seventh to tenth switch tubes $S_7$ to $S_{10}$, the seventh to tenth switch tubes $S_7$ to $S_{10}$ are controlled to be turned on or off, so as to control the second full-bridge circuit unit 500 to operate according to the following four modes:

Mode 1: When the seventh switch tube $S_7$ and the tenth switch tube $S_{10}$ are in the conducting state, the eighth switch tube $S_8$ and the ninth switch tube $S_9$ are in the off state. Mode 2: When the eighth switch tube $S_8$ and the ninth switch tube $S_9$ are in the conducting state, the seventh switch tube $S_7$ and the tenth switch tube $S_{10}$ are in the off state. Mode 3: When the seventh switch tube $S_7$ and the ninth switch tube $S_9$ are in the conducting state, the eighth switch tube $S_8$ and the tenth switch tube $S_{10}$ are in the off state. Mode 4: When the eighth switch tube $S_8$ and the tenth switch tube $S_{10}$ are in the conducting state, the seventh switch tube $S_7$ and the ninth switch tube $S_9$ are in the off state.

The duty ratios of the driving signals of the seventh switch tube $S_7$ and the tenth switch tube $S_{10}$ are 50%, and only one of the two switch tubes of the same bridge arm is in a conducting state. In each switch cycle $T_s$ mode 1, mode 2, mode 3 and mode 4 are executed once respectively, and the execution sequence and time of each mode depend on the internal phase relationship of the driving signals of each switch tube.

It should be noted that the internal phase relationship between the driving signal of each switch tube in the second full-bridge circuit unit 500 and the external phase relationship between the driving signal of the second full-bridge circuit unit 500 and the driving signal of the first full-bridge circuit unit 300 may control the power factor of the AC terminal current $i_g$ and the input/output power of the DC terminal. In the rectification mode, the driving signal of the first full-bridge circuit unit 300 is precedent to the driving signal of the second full-bridge circuit unit 500, and the energy is transmitted from the AC terminal to the DC terminal. In the inverter mode, the driving signal of the first full-bridge circuit unit 300 lags behind the driving signal of the second full-bridge circuit unit 500, and energy is transmitted from the DC terminal to the AC terminal.

Figure 2A:
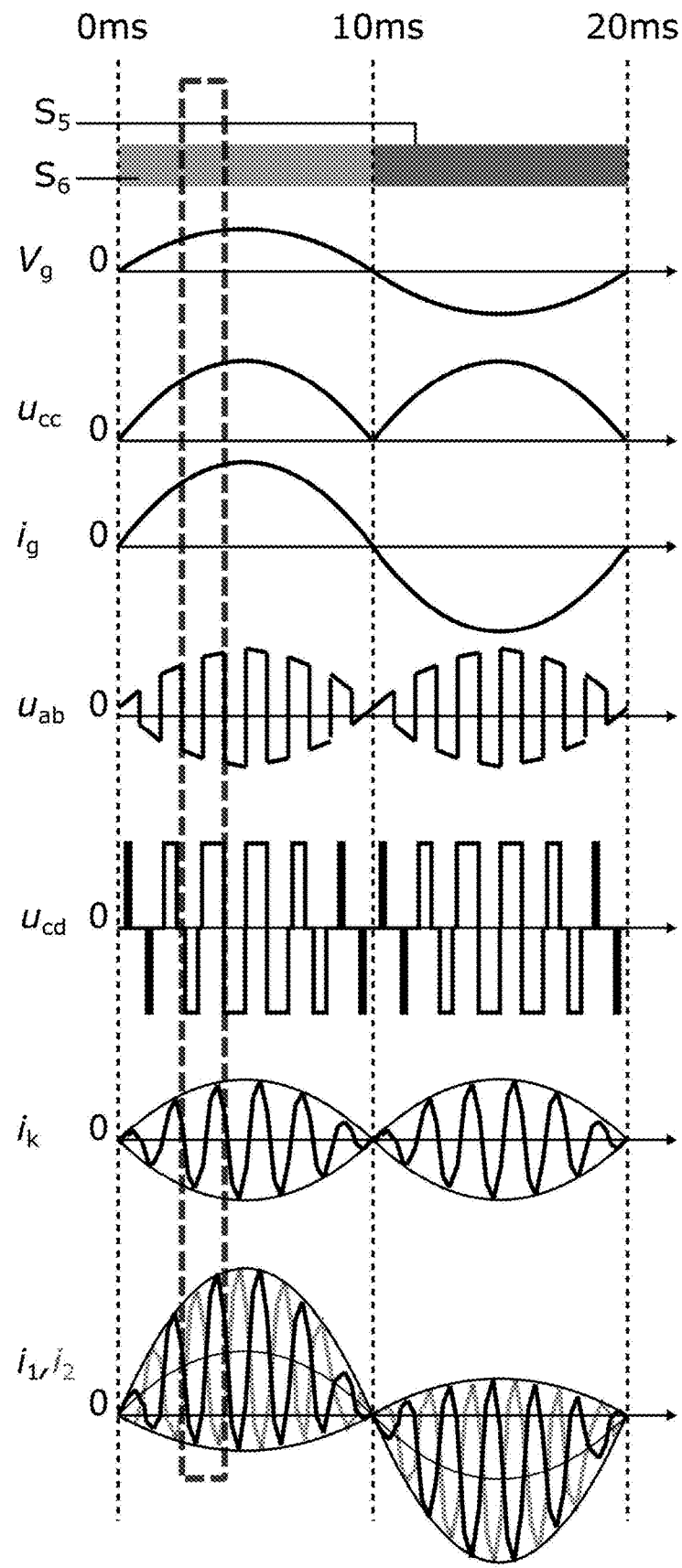
FIG. 2*a* is a waveform diagram of various switch driving signals, voltages and currents when the single-stage isolated bidirectional converter operates in a rectification mode according to a specific embodiment of the present disclosure.
Figure 2B:
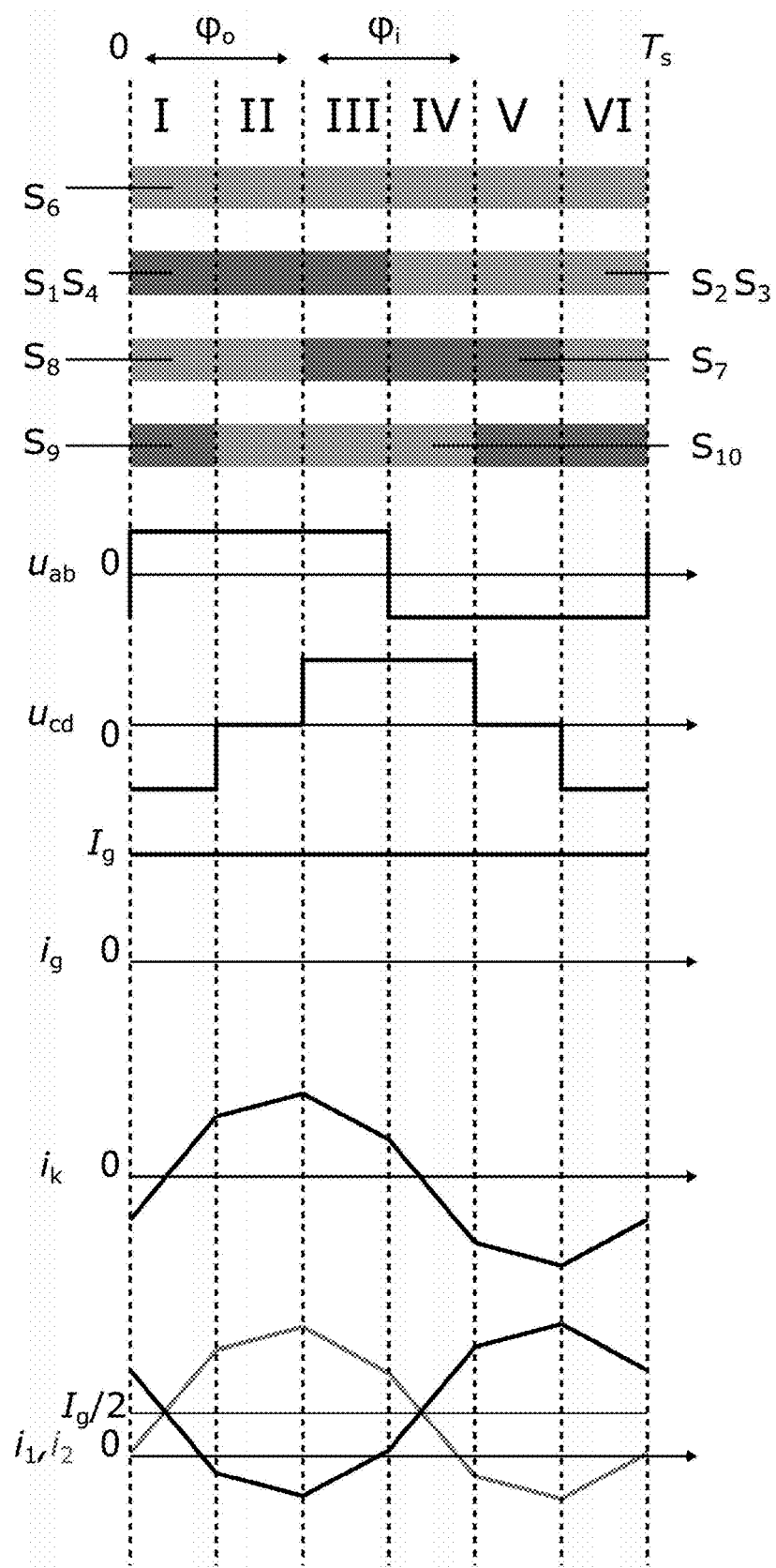
FIG. 2*b* is a waveform diagram of various switch driving signals, voltages and currents when the single-stage isolated bidirectional converter operates in a rectification mode according to another specific embodiment of the present disclosure.

According to a specific embodiment of the present disclosure, taking the rectification mode as an example, FIG. 2a shows the operation waveform of a single-stage isolated bidirectional converter in a power frequency cycle of 20 ms, and the waveform of one switch cycle in FIG. 2a is amplified, thus obtaining the waveform of FIG. 2b. As shown in FIG. 2a, in one power frequency cycle, the half-bridge circuit unit 400 operates twice, that is, when the AC terminal voltage $V_g$ is positive, the sixth switch tube $S_6$ is in the conducting state, and the fifth switch tube $S_5$ is in the off state. When the AC terminal voltage $V_g$ is negative, the fifth switch tube $S_5$ is in the conducting state, and the sixth switch tube $S_6$ is in the off state.

As shown in FIG. 2a and FIG. 2b, the duty ratios of the driving signals of the first to fourth switch tubes $S_1$ to $S_4$ in the first full-bridge circuit unit 300 are all 50%. The voltage $$u_{cc} = \frac{|V_g|}{1-0.5}$$

across the filter capacitor 800 may be calculated through the transformation ratio formula of the boost converter. Therefore, the voltage $u_{cc}$ across the filter capacitor 800 is twice the absolute value of the grid voltage, i.e., $|2 V_g|$. Since the single-stage isolated bidirectional converter operates in the rectification mode, the AC terminal voltage $V_g$ is in the same phase with the current $i_g$.

As shown in FIG. 2a, the driving signals of the first switch tube $S_1$, the fourth switch tube $S_4$, the second switch tube $S_2$, and the third switch tube $S_3$ in the first full-bridge circuit unit 300 have a phase difference of 180°. The voltage $u_{cc}$ across the filter capacitor 800 is inverted to the voltage $u_{ab}$ between the midpoints of the bridge arms of the first full-bridge circuit unit 300. The cycle of $u_{ab}$ is the switch cycle $T_s$, the positive and negative cycles each account for 50%, and the amplitude of the outer envelope is $u_{cc}$.

As shown in FIG. 2a, the duty ratios of the driving signals of the seventh to tenth switch tubes $S_7$ to $S_{10}$ in the second full-bridge circuit unit 500 are all 50%, and the driving signals of the seventh switch tube $S_7$ and the eighth switch tube $S_8$ are precedent to the phase $\varphi_i$ of the driving signals of the ninth switch tube $S_9$ and the tenth switch tube $S_{10}$. The DC terminal voltage $V_b$ is inverted to the voltage $u_{cd}$ between the midpoints the bridge arms of the second full-bridge circuit unit 500, the cycle of $u_{cd}$ is the switch cycle $T_s$, the positive and negative cycles are symmetrical, the amplitude is $V_b$, and the duty ratio of voltage is less than or equal to 50%.

As shown in FIG. 2a, the secondary current $i_k$ of the transformer 700 is a high-frequency alternating current, and does not include a power-frequency alternating current component. The current $i_1$ of the first phase-shift inductor L1 and the current $i_2$ of the second phase-shift inductor L2 include power frequency components and high-frequency components. The power frequency components of the currents $i_1$ and $i_2$ are both equal to half of the AC side current, namely $$\frac{|i_g|}{2},$$

the high-frequency component of the current $i_1$ is equal to $-i_k$, and the high-frequency component of the current $i_2$ is equal to $i_k$.

For ease of description, it may be assumed that the transformation ratio of the first winding 710 and the second winding 720 of the transformer 700 is equal to 1, the first phase-shift inductor L1 and the second phase-shift inductor L2 have no coupling relationship, and the inductance is $L_p$.

Figure 3:
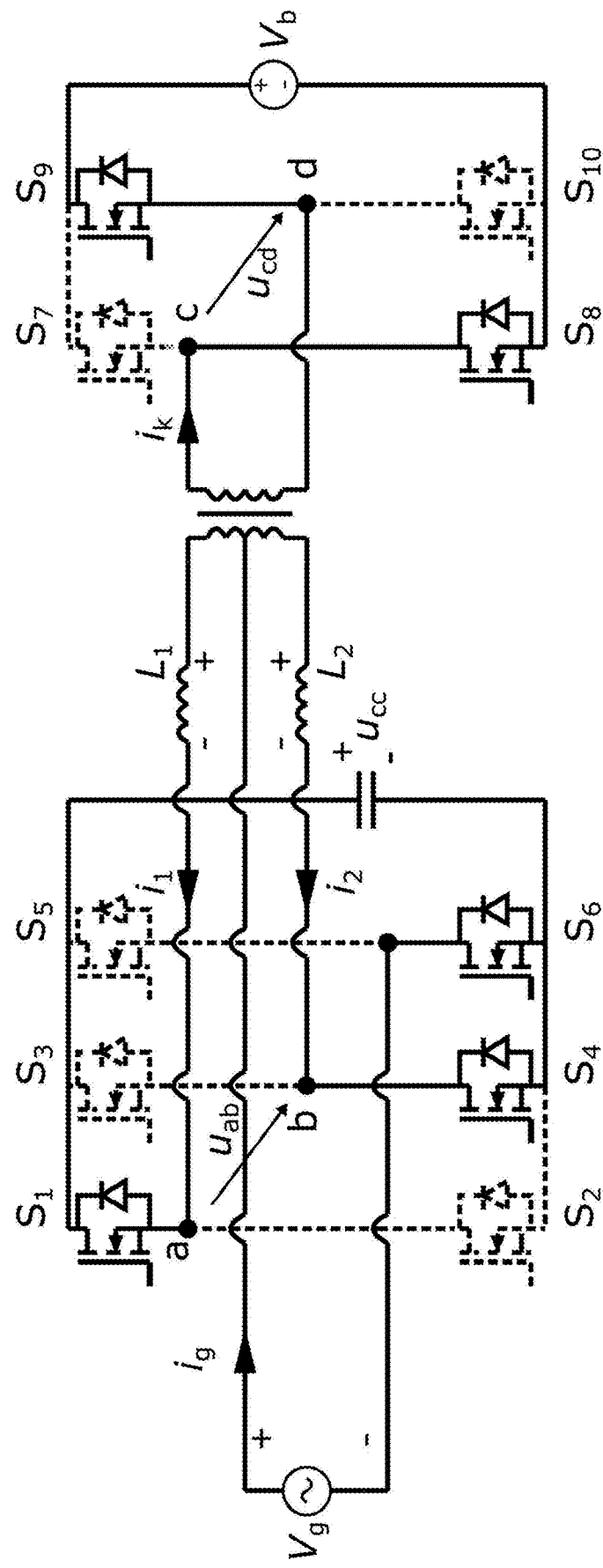
FIG. 3 is a schematic view of a single-stage isolated bidirectional converter when operating in the first stage of a rectification mode according to a specific embodiment of the present disclosure.

Correspondingly, in the first stage of the operation stage of the rectification mode, namely stage 1, as shown in FIG. 3, the first switch tube $S_1$, the fourth switch tube $S_4$, the sixth switch tube $S_6$, the eighth switch tube $S_8$ and the ninth switch tube $S_9$ are in the conducting state; the second switch tube $S_2$, the third switch tube $S_3$, the fifth switch tube $S_5$, the seventh switch tube $S_7$ and the tenth switch tube $S_{10}$ are in the off state, which corresponds to the stage I of FIG. 2b. The potential difference $u_{ab}$ at the midpoint of the bridge arm of the first full-bridge circuit unit 300 is equal to $u_{cc}$, and the potential difference $u_{cd}$ at the midpoint of the bridge arm of the second full-bridge circuit unit 500 is equal to $-V_b$. The current $i_1$ of the first phase-shift inductor L1 decreases linearly with a rate of $$\frac{-u_{cc} - V_b}{2L_p};$$

the current $i_2$ of the second phase-shift inductor L2 increases linearly with a rate of $$\frac{u_{cc} + V_b}{2L_p}.$$

The AC terminal current $i_g$ is equal to the sum of the currents $i_1$ and $i_2$, and the current $i_1$ falls at approximately the same rate as the current $i_2$ rises, so the AC terminal current $i_g$ approximately maintains unchanged with the amplitude $I_g$. The secondary currents $i_k$ and $i_2$ of the transformer rise at approximately the same rate.

Figure 4:
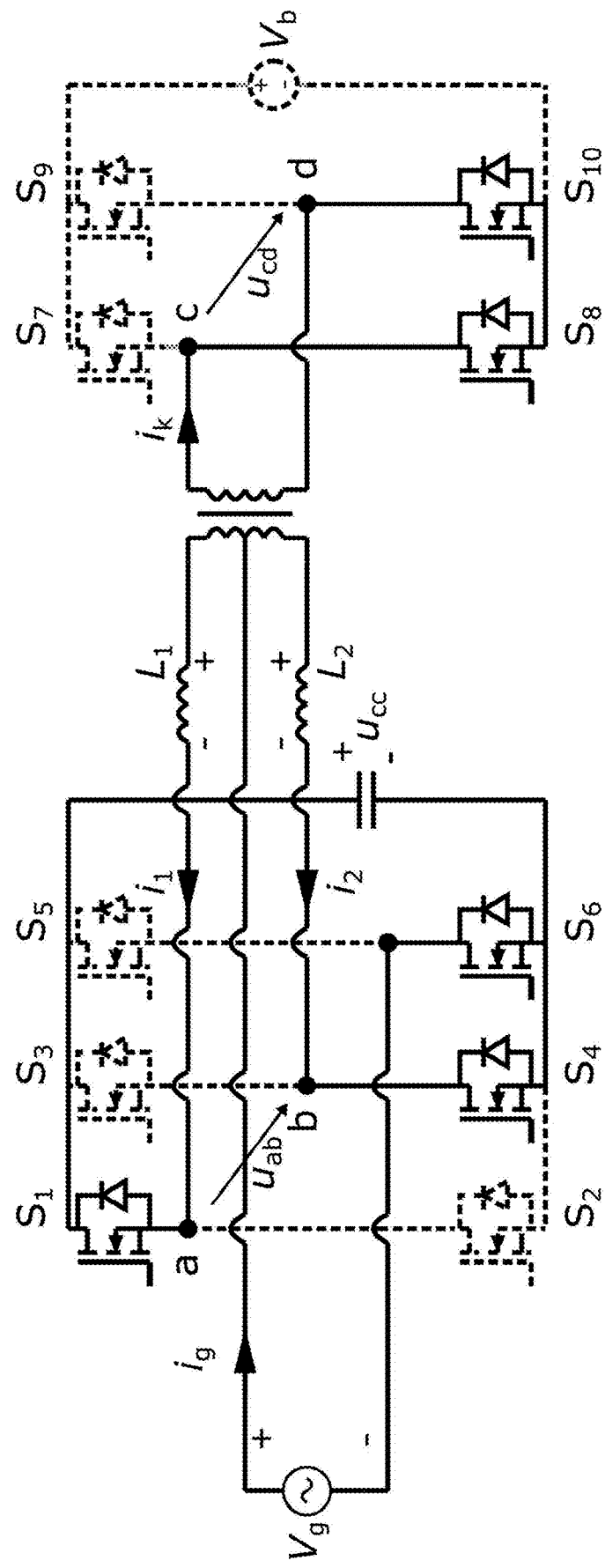
FIG. 4 is a schematic view of a single-stage isolated bidirectional converter when operating in the second stage of a rectification mode according to a specific embodiment of the present disclosure.

In the second stage of the rectification mode, that is, stage 2, as shown in FIG. 4, the first switch tube $S_1$, the fourth switch tube $S_4$, the sixth switch tube $S_6$, the eighth switch tube $S_8$ and the tenth switch tube $S_{10}$ are in a conducting state, and the second switch tube $S_2$, the third switch tube $S_3$, the fifth switch tube $S_5$, the seventh switch tube $S_7$, and the ninth switch tube $S_9$ are in the off state, which corresponds to stage II of FIG. 2b. The potential difference $u_{ab}$ at the midpoint of the bridge arm of the first full-bridge circuit unit 300 is equal to $u_{cc}$, and the potential difference $u_{cd}$ at the midpoint of the bridge arm of the second full-bridge circuit unit 500 is equal to zero. The current $i_1$ of the first phase-shift inductor L1 decreases linearly with a rate of $$\frac{-u_{cc}}{2L_p};$$

the current $i_2$ of the second phase-shift inductor L2 increases linearly with a rate of $$\frac{u_{cc}}{2L_p}.$$

The AC terminal current $i_g$ is equal to the sum of the currents $i_1$ and $i_2$, and the current $i_1$ falls at approximately the same rate as the current $i_2$ rises, so the AC terminal current $i_g$ approximately keeps unchanged with the amplitude $I_g$. The secondary currents $i_k$ and $i_2$ of the transformer rise at approximately the same rate.

Figure 5:
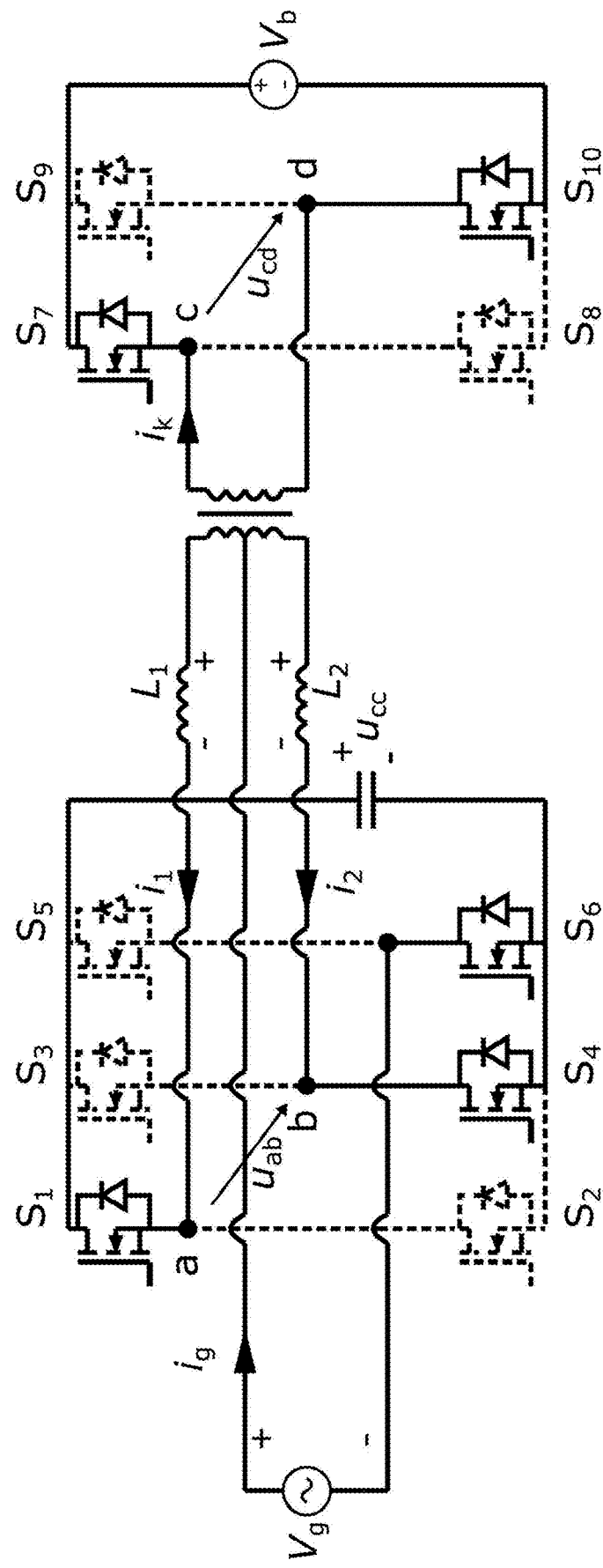
FIG. 5 is a schematic view of a single-stage isolated bidirectional converter when operating in the third stage of a rectification mode according to a specific embodiment of the present disclosure.

In the third stage of the rectification mode, namely stage 3, as shown in FIG. 5, the first switch tube $S_1$, the fourth switch tube $S_4$, the sixth switch tube $S_6$, the seventh switch tube $S_7$ and the tenth switch tube $S_{10}$ are in the conducting state, and the second switch tube $S_2$, the third switch tube $S_3$, the fifth switch tube $S_5$, the eighth switch tube $S_8$, and the ninth switch tube $S_9$ are in the off state, which corresponds to stage III of FIG. 2b. The potential difference $u_{ab}$ at the midpoint of the bridge arm of the first full-bridge circuit unit 300 is equal to $u_{cc}$, and the potential difference $u_{cd}$ at the midpoint of the bridge arm of the second full-bridge circuit unit 500 is equal to $V_b$. The current $i_1$ of the first phase-shift inductor L1 rises linearly at a rate of $$\frac{-u_{cc}+V_b}{2L_p};$$

the current $i_2$ of the second phase-shift inductor L2 decreases linearly at a rate of $$\frac{u_{cc}-V_b}{2L_p}.$$

The AC terminal current $i_g$ is equal to the sum of the currents $i_1$ and $i_2$, and the current $i_1$ rises at approximately the same rate as the current $i_2$ falls, so the AC terminal current $i_g$ approximately keeps unchanged with the amplitude $I_g$. The secondary currents $i_k$ and $i_2$ of the transformer fall at approximately the same rate.

Figure 6:
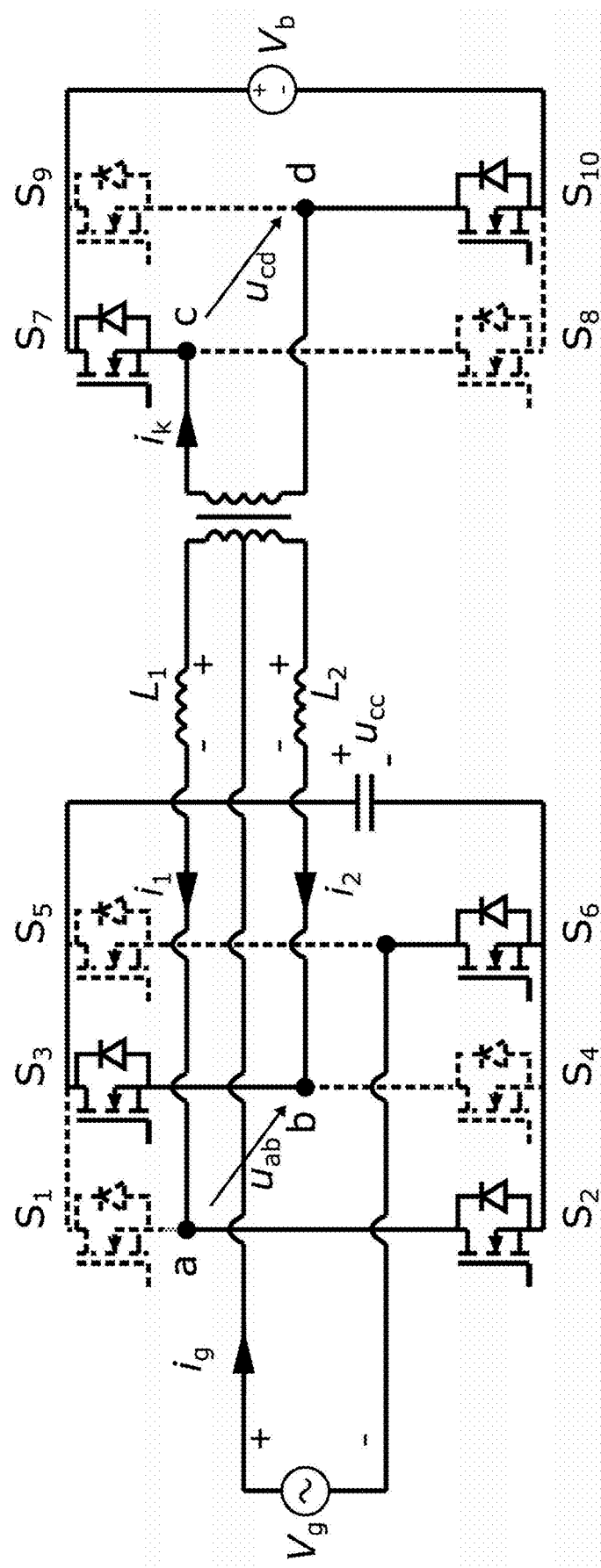
FIG. 6 is a schematic view of a single-stage isolated bidirectional converter when operating in the fourth stage of a rectification mode according to a specific embodiment of the present disclosure.

In the fourth stage of the rectification mode, namely stage 4, as shown in FIG. 6, the second switch tube $S_2$, the third switch tube $S_3$, the sixth switch tube $S_6$, the seventh switch tube $S_7$ and the tenth switch tube $S_{10}$ are in the conducting state, and the first switch tube $S_1$, the fourth switch tube $S_4$, the fifth switch tube $S_5$, the eighth switch tube $S_8$, and the ninth switch tube $S_9$ are in the off state, which corresponds to stage IV of FIG. 2b. The potential difference $u_{ab}$ at the midpoint of the bridge arm of the first full-bridge circuit unit 300 is equal to $-u_{cc}$, and the potential difference $u_{cd}$ at the midpoint of the bridge arm of the second full-bridge circuit unit 500 is equal to $V_b$. The current $i_1$ of the first phase-shift inductor L1 rises linearly with a rate of $$\frac{u_{cc}+V_b}{2L_p};$$

the current $i_2$ of the second phase-shift inductor L2 decreases linearly with a rate of $$\frac{u_{cc}+V_b}{2L_p}.$$

The AC terminal current $i_g$ is equal to the sum of the currents $i_1$ and $i_2$, and the current $i_1$ rises at approximately the same rate as the current $i_2$ falls, so the AC terminal current $i_g$ approximately keeps unchanged with the amplitude $I_g$. The secondary currents $i_k$ and $i_2$ of the transformer fall at approximately the same rate.

Figure 7:
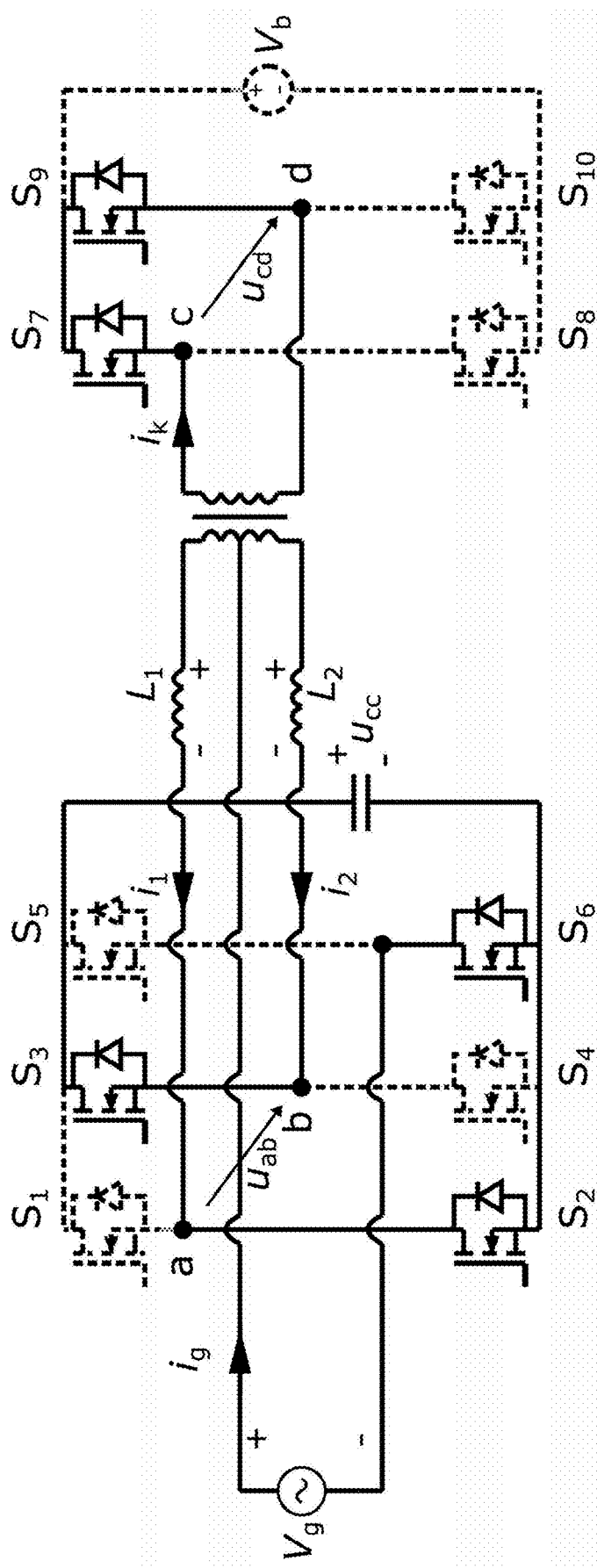
FIG. 7 is a schematic view of a single-stage isolated bidirectional converter when operating in the fifth stage of a rectification mode according to a specific embodiment of the present disclosure.

In the fifth stage of the rectification mode, namely stage 5, as shown in FIG. 7, the second switch tube $S_2$, the third switch tube $S_3$, the sixth switch tube $S_6$, the seventh switch tube $S_7$ and the ninth switch tube $S_9$ are in a conducting state, and the first switch tube $S_1$, the fourth switch tube $S_4$, the fifth switch tube $S_5$, the eighth switch tube $S_8$, and the tenth switch tube $S_{10}$ are in the off state, which corresponds to the stage V of FIG. 2b. The potential difference $u_{ab}$ at the midpoint of the bridge arm of the first full-bridge circuit unit 300 is equal to $-u_{ab}$ and the potential difference $u_{cd}$ at the midpoint of the bridge arm of the second full-bridge circuit unit 500 is equal to zero. The current $i_1$ of the first phase-shift inductor L1 increases linearly with the rate of $$\frac{u_{cc}}{L_p};$$

the current $i_2$ of the second phase-shift inductor L2 decreases linearly with the rate of $$-\frac{u_{cc}}{L_p}.$$

The AC terminal current $i_g$ is equal to the sum of the currents $i_1$ and $i_2$, and the current $i_1$ rises at approximately the same rate as the current $i_2$ falls, so the AC terminal current $i_g$ approximately keeps unchanged with the amplitude $I_g$. The secondary currents $i_k$ and $i_2$ of the transformer fall at approximately the same rate.

Figure 8:
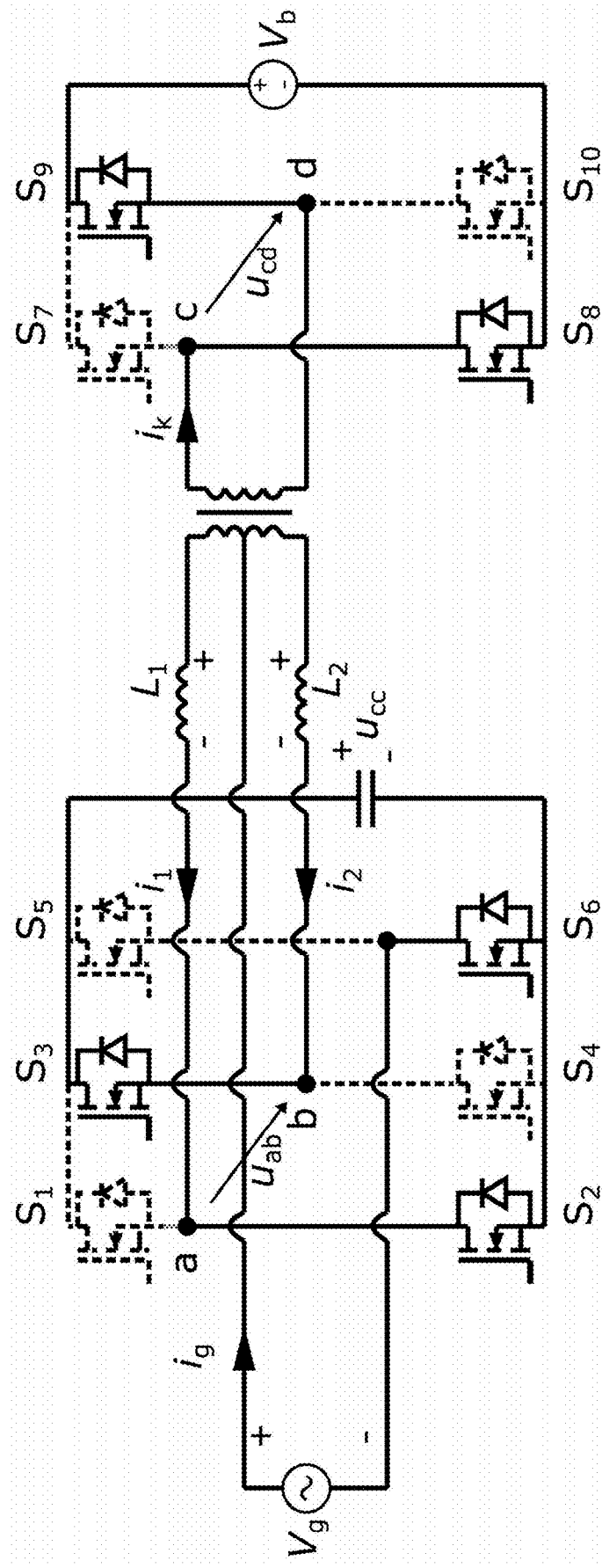
FIG. 8 is a schematic view of a single-stage isolated bidirectional converter when operating in the sixth stage of a rectification mode according to a specific embodiment of the present disclosure.

In the sixth stage of the rectification mode, namely stage 6, as shown in FIG. 8, the second switch tube $S_2$, the third switch tube $S_3$, the sixth switch tube $S_6$, the eighth switch tube $S_8$ and the ninth switch tube $S_9$ are in the conducting state, and the first switch tube $S_1$, the fourth switch tube $S_4$, the fifth switch tube $S_5$, the seventh switch tube $S_7$, and the tenth switch tube $S_{10}$ are in an off state, which corresponds to the stage VI of FIG. 2b. The potential difference $u_{ab}$ at the midpoint of the bridge arm of the first full-bridge circuit unit 300 is equal to $-u_{cc}$, and the potential difference $u_{cd}$ at the midpoint of the bridge arm of the second full-bridge circuit unit 500 is equal to zero. The current $i_1$ of the first phase-shift inductor L1 decreases linearly with a rate of $$\frac{u_{cc} - V_b}{2L_p};$$

the current $i_2$ of the second phase-shift inductor L2 increases linearly with a rate of $$\frac{-u_{cc} + V_b}{2L_p}.$$

The AC terminal current $i_g$ is equal to the sum of currents $i_1$ and $i_2$, and the current $i_1$ rises at approximately the same rate as the current $i_2$ falls, so the AC terminal current $i_g$ approximately keeps unchanged with the amplitude $I_g$. The secondary currents $i_k$ and $i_2$ of the transformer fall at approximately the same rate.

To sum up, the single-stage isolated bidirectional converter of the present disclosure includes only one stage of power conversion, so the loss of the converter is small and the conversion efficiency is high. Moreover, the single-stage isolated bidirectional converter of the present disclosure includes only high-frequency filter capacitor with small capacitance to filter the current ripple at the switching frequency, and does not include the bus capacitor with large capacitance as an energy buffer unit, so there is no need to use aluminum electrolytic capacitors. Accordingly, the converter is small in size and has a long service life. Furthermore, the single-stage isolated bidirectional converter of the present disclosure does not need a boost inductor, has little electromagnetic interference to the power grid, and does not cause additional loss for semiconductor switch tube and loss for phase-shift inductor core. Besides, the topology does not have the characteristics of a boost inductor. Therefore, the size and magnetic loss of the converter are reduced, and the cost of the converter is reduced.

According to the single-stage isolated bidirectional converter in the embodiment of the present disclosure, the converter includes: a DC voltage port, an AC voltage port, a first full-bridge circuit unit, a half-bridge circuit unit, a second full-bridge circuit unit, a phase-shift unit, a transformer and a filter capacitor. The AC voltage port includes a first port and a second port; the DC voltage port includes a third port and a fourth port; and the transformer includes a first winding and a second winding. The first winding is provided with a center tap, and the center tap is connected to the first port. The two ends of the first winding are respectively connected to the midpoints of the two bridge arms of the first full-bridge circuit unit through the phase-shift unit, and the two ends of the second winding are respectively connected to the midpoints of the two bridge arms of the second full-bridge circuit unit. The two ends of the first full-bridge circuit unit are respectively connected to the two ends of the half-bridge circuit unit; the two ends of the half-bridge circuit unit are also connected to the two ends of the filter capacitor. The midpoint of the bridge arm of the half-bridge circuit unit is connected to the second port; the two ends of the second full-bridge circuit unit are respectively connected to the third port and the fourth port. Therefore, the single-stage isolated bidirectional converter of the present disclosure only includes one-stage power conversion, so the loss is small and the conversion efficiency is high. Moreover, the single-stage isolated bidirectional converter only includes a filter capacitor with a small capacitance value, and there is no need to use a bus capacitor with a large capacitance value as an energy buffer unit. Therefore, the converter is small in size and has a long service life. In the meantime, the single-stage isolated bidirectional converter of the present disclosure does not need a boost inductor, that is, the topology does not have the characteristics of a boost inductor, so the size and magnetic loss of the converter is reduced, thereby reducing the cost of the converter.

Corresponding to the above embodiments, the present disclosure further provides a control method for a single-stage isolated bidirectional converter.

The control method for a single-stage isolated bidirectional converter described in an embodiment of the present disclosure includes the following steps: after a rectification or inverter control command is received, a corresponding driving signal with duty ratio of 50% is sent to the driving terminals of the first to the tenth switch tubes to control only one of the two switch tubes in the same bridge arm in the first full-bridge circuit unit to be in a conducting state, to control only one of the two switch tubes in the half-bridge circuit unit to be in a conducting state, and to control only one of the two switch tubes in the same bridge arm in the second full-bridge circuit unit to be in a conducting state, so that the single-stage isolated bidirectional converter operates in the rectification mode or the inverter mode. When the single-stage isolated bidirectional converter operates in the rectification mode, the driving signal corresponding to the first full-bridge circuit unit is precedent to the driving signal corresponding to the second full-bridge circuit unit. When the single-stage isolated bidirectional converter operates in the inverter mode, the driving signal corresponding to the first full-bridge circuit unit lags behind the driving signal corresponding to the second full-bridge circuit unit.

Specifically, based on the single-stage isolated bidirectional converter in the above embodiment, by inputting driving signals to the driving terminals of the first to fourth switch tubes $S_1$ to $S_4$, the first to fourth switch tubes $S_1$ to $S_4$ are controlled to be turned on or off, thereby controlling the first full-bridge circuit unit 300 to operate in the following two modes:

Mode 1: When the first switch tube $S_1$ and the fourth switch tube $S_4$ are in a conducting state, the second switch tube $S_2$ and the third switch tube $S_3$ are in an off state. Mode 2: When the second switch tube $S_2$ and the third switch tube $S_3$ are in a conducting state, the first switch tube $S_1$ and the fourth switch tube $S_4$ are in an off state.

The duty ratios of the driving signals of the first to fourth switch tubes $S_1$ to $S_4$ are 50%, and only one of the two switch tubes of the same bridge arm is in a conducting state. In each switch cycle $T_s$ mode 1 and mode 2 are respectively executed once, and the durations of mode 1 and mode 2 each account for 50%.

By inputting driving signals to the driving terminals of the fifth switch tube $S_5$ and the sixth switch tube $S_6$ to control the fifth switch tube $S_5$ and the sixth switch tube $S_6$ to be turned on or off, the half-bridge circuit unit 400 is controlled to operate in the following manner:

If the single-stage isolated bidirectional converter operates in the rectification mode, when the AC terminal voltage $V_g$ is positive, the sixth switch tube $S_6$ is in the on state or the off state, and the fifth switch tube $S_5$ is in the off state. When the AC terminal voltage $V_g$ is negative, the fifth switch tube $S_5$ is in the on state or the off state, and the sixth switch tube $S_6$ is in the off state. If the single-stage isolated bidirectional converter operates in the inverter mode, when the AC terminal voltage $V_g$ is positive, the fifth switch tube $S_5$ is in the on state, and the sixth switch tube $S_6$ is in the off state. When the AC terminal voltage $V_g$ is negative, the sixth switch tube $S_6$ is in the on state, and the fifth switch tube $S_5$ is in the off state.

By inputting driving signals to the driving terminals of the seventh to tenth switch tubes $S_7$ to $S_{10}$, the seventh to tenth switch tubes $S_7$ to $S_{10}$ are controlled to be turned on or off, so as to control the second full-bridge circuit unit 500 to operate according to the following four modes:

Mode 1: When the seventh switch tube $S_7$ and the tenth switch tube $S_{10}$ are in the conducting state, the eighth switch tube $S_8$ and the ninth switch tube $S_9$ are in the off state. Mode 2: When the eighth switch tube $S_8$ and the ninth switch tube $S_9$ are in the conducting state, the seventh switch tube $S_7$ and the tenth switch tube $S_{10}$ are in the off state. Mode 3: When the seventh switch tube $S_7$ and the ninth switch tube $S_9$ are in the conducting state, the eighth switch tube $S_8$ and the tenth switch tube $S_{10}$ are in the off state. Mode 4: When the eighth switch tube $S_8$ and the tenth switch tube $S_{10}$ are in the conducting state, the seventh switch tube $S_7$ and the ninth switch tube $S_9$ are in the off state.

The duty ratios of the driving signals of the seventh switch tube $S_7$ and the tenth switch tube $S_{10}$ are 50%, and only one of the two switch tubes of the same bridge arm is in a conducting state. In each switch cycle $T_s$ mode 1, mode 2, mode 3 and mode 4 are executed once respectively, and the execution sequence and time of each mode depend on the internal phase relationship of the driving signals of each switch tube.

It should be noted that the internal phase relationship between the driving signal of each switch tube in the second full-bridge circuit unit 500 and the external phase relationship between the driving signal of the second full-bridge circuit unit 500 and the driving signal of the first full-bridge circuit unit 300 may control the power factor of the AC terminal current $i_g$ and the input/output power of the DC terminal. In the rectification mode, the driving signal of the first full-bridge circuit unit 300 is precedent to the driving signal of the second full-bridge circuit unit 500, and the energy is transmitted from the AC terminal to the DC terminal. In the inverter mode, the driving signal of the first full-bridge circuit unit 300 lags behind the driving signal of the second full-bridge circuit unit 500, and energy is transmitted from the DC terminal to the AC terminal.

According to a specific embodiment of the present disclosure, taking the rectification mode as an example, FIG. 2a shows the operation waveform of a single-stage isolated bidirectional converter in a power frequency cycle of 20 ms, and the waveform of one switch cycle in FIG. 2a is amplified, thus obtaining the waveform of FIG. 2b. As shown in FIG. 2a, in one power frequency cycle, the half-bridge circuit unit 400 operates twice, that is, when the AC terminal voltage $V_g$ is positive, the sixth switch tube $S_6$ is in the conducting state, and the fifth switch tube $S_5$ is in the off state. When the AC terminal voltage $V_g$ is negative, the fifth switch tube $S_5$ is in the conducting state, and the sixth switch tube $S_6$ is in the off state.

As shown in FIG. 2a and FIG. 2b, the duty ratios of the driving signals of the first to fourth switch tubes $S_1$ to $S_4$ in the first full-bridge circuit unit 300 are all 50%. The voltage $$u_{cc} = \frac{|V_g|}{1 - 0.5}$$

across the filter capacitor 800 may be calculated through the transformation ratio formula of the boost converter. Therefore, the voltage $u_{cc}$ across the filter capacitor 800 is twice the absolute value of the grid voltage, i.e., $|2 V_g|$. Since the single-stage isolated bidirectional converter operates in the rectification mode, the AC terminal voltage $V_g$ is in the same phase with the current $i_g$.

As shown in FIG. 2a, the driving signals of the first switch tube $S_1$, the fourth switch tube $S_4$, the second switch tube $S_2$, and the third switch tube $S_3$ in the first full-bridge circuit unit 300 have a phase difference of 180°. The voltage $u_{cc}$ across the filter capacitor 800 is inverted to the voltage $u_{ab}$ between the midpoints of the bridge arms of the first full-bridge circuit unit 300. The cycle of $u_{ab}$ is the switch cycle $T_s$, the positive and negative cycles each account for 50%, and the amplitude of the outer envelope is $u_{cc}$.

As shown in FIG. 2a, the duty ratios of the driving signals of the seventh to tenth switch tubes $S_7$ to $S_{10}$ in the second full-bridge circuit unit 500 are all 50%, and the driving signals of the seventh switch tube $S_7$ and the eighth switch tube $S_8$ are precedent to the phase $\varphi_i$ of the driving signals of the ninth switch tube $S_9$ and the tenth switch tube $S_{10}$. The DC terminal voltage $V_b$ is inverted to the voltage $u_{cd}$ between the midpoints the bridge arms of the second full-bridge circuit unit 500, the cycle of $u_{cd}$ is the switch cycle $T_s$, the positive and negative cycles are symmetrical, the amplitude is $V_b$, and the duty ratio of voltage is less than or equal to 50%.

As shown in FIG. 2a, the secondary current $i_k$ of the transformer 700 is a high-frequency alternating current, and does not include a power-frequency alternating current component. The current $i_1$ of the first phase-shift inductor L1 and the current $i_2$ of the second phase-shift inductor L2 include power frequency components and high-frequency components. The power frequency components of the currents $i_1$ and $i_2$ are both equal to half of the AC side current, namely $$\frac{|i_g|}{2},$$

the high-frequency component of the current $i_1$ is equal to $-i_k$, and the high-frequency component of the current $i_2$ is equal to $i_k$.

For ease of description, it may be assumed that the transformation ratio of the first winding 710 and the second winding 720 of the transformer 700 is equal to 1, the first phase-shift inductor L1 and the second phase-shift inductor L2 have no coupling relationship, and the inductance is $L_p$.

Correspondingly, in the first stage of the operation stage of the rectification mode, namely stage 1, as shown in FIG. 3, the first switch tube $S_1$, the fourth switch tube $S_4$, the sixth switch tube $S_6$, the eighth switch tube $S_8$ and the ninth switch tube $S_9$ are in the conducting state; the second switch tube $S_2$, the third switch tube $S_3$, the fifth switch tube $S_5$, the seventh switch tube $S_7$ and the tenth switch tube $S_{10}$ are in the off state, which corresponds to the stage I of FIG. 2b. The potential difference $u_{ab}$ at the midpoint of the bridge arm of the first full-bridge circuit unit 300 is equal to $u_{cc}$, and the potential difference $u_{cd}$ at the midpoint of the bridge arm of the second full-bridge circuit unit 500 is equal to $-V_b$. The current $i_1$ of the first phase-shift inductor L1 decreases linearly with a rate of $$\frac{-u_{cc} - V_b}{2L_p};$$

the current $i_2$ of the second phase-shift inductor L2 increases linearly with a rate of $$\frac{u_{cc} + V_b}{2L_p}.$$

The AC terminal current $i_g$ is equal to the sum of the currents $i_1$ and $i_2$, and the current $i_1$ falls at approximately the same rate as the current $i_2$ rises, so the AC terminal current $i_g$ approximately maintains unchanged with the amplitude $I_g$. The secondary currents $i_k$ and $i_2$ of the transformer rise at approximately the same rate.

In the second stage of the rectification mode, that is, stage 2, as shown in FIG. 4, the first switch tube $S_1$, the fourth switch tube $S_4$, the sixth switch tube $S_6$, the eighth switch tube $S_8$ and the tenth switch tube $S_{10}$ are in a conducting state, and the second switch tube $S_2$, the third switch tube $S_3$, the fifth switch tube $S_5$, the seventh switch tube $S_7$, and the ninth switch tube $S_9$ are in the off state, which corresponds to stage II of FIG. 2b. The potential difference $u_{ab}$ at the midpoint of the bridge arm of the first full-bridge circuit unit 300 is equal to $u_{cc}$, and the potential difference $u_{cd}$ at the midpoint of the bridge arm of the second full-bridge circuit unit 500 is equal to zero. The current $i_1$ of the first phase-shift inductor L1 decreases linearly with a rate of $$\frac{-u_{cc}}{2L_p};$$

the current $i_2$ of the second phase-shift inductor L2 increases linearly with a rate of $$\frac{u_{cc}}{2L_p}.$$

The AC terminal current $i_g$ is equal to the sum of the currents $i_1$ and $i_2$, and the current $i_1$ falls at approximately the same rate as the current $i_2$ rises, so the AC terminal current $i_g$ approximately keeps unchanged with the amplitude $I_g$. The secondary currents $i_k$ and $i_2$ of the transformer rise at approximately the same rate.

In the third stage of the rectification mode, namely stage 3, as shown in FIG. 5, the first switch tube $S_1$, the fourth switch tube $S_4$, the sixth switch tube $S_6$, the seventh switch tube $S_7$ and the tenth switch tube $S_{10}$ are in the conducting state, and the second switch tube $S_2$, the third switch tube $S_3$, the fifth switch tube $S_5$, the eighth switch tube $S_8$, and the ninth switch tube $S_9$ are in the off state, which corresponds to stage III of FIG. 2b. The potential difference $u_{ab}$ at the midpoint of the bridge arm of the first full-bridge circuit unit 300 is equal to $u_{cc}$, and the potential difference $u_{cd}$ at the midpoint of the bridge arm of the second full-bridge circuit unit 500 is equal to $V_b$. The current $i_1$ of the first phase-shift inductor L1 rises linearly at a rate of $$\frac{-u_{cc} + V_b}{2L_p};$$

the current $i_2$ of the second phase-shift inductor L2 decreases linearly at a rate of $$\frac{u_{cc} - V_b}{2L_p}.$$

The AC terminal current $i_g$ is equal to the sum of the currents $i_1$ and $i_2$, and the current $i_1$ rises at approximately the same rate as the current $i_2$ falls, so the AC terminal current $i_g$ approximately keeps unchanged with the amplitude $I_g$. The secondary currents $i_k$ and $i_2$ of the transformer fall at approximately the same rate.

In the fourth stage of the rectification mode, namely stage 4, as shown in FIG. 6, the second switch tube $S_2$, the third switch tube $S_3$, the sixth switch tube $S_6$, the seventh switch tube $S_7$ and the tenth switch tube $S_{10}$ are in the conducting state, and the first switch tube $S_1$, the fourth switch tube $S_4$, the fifth switch tube $S_5$, the eighth switch tube $S_8$, and the ninth switch tube $S_9$ are in the off state, which corresponds to stage IV of FIG. 2b. The potential difference $u_{ab}$ at the midpoint of the bridge arm of the first full-bridge circuit unit 300 is equal to $-u_{cc}$, and the potential difference $u_{cd}$ at the midpoint of the bridge arm of the second full-bridge circuit unit 500 is equal to $V_b$. The current $i_1$ of the first phase-shift inductor L1 rises linearly with a rate of $$\frac{u_{cc} + V_b}{2L_p};$$

the current $i_2$ of the second phase-shift inductor L2 decreases linearly with a rate of $$\frac{u_{cc} + V_b}{2L_p}.$$

The AC terminal current $i_g$ is equal to the sum of the currents $i_1$ and $i_2$, and the current $i_1$ rises at approximately the same rate as the current $i_2$ falls, so the AC terminal current $i_g$ approximately keeps unchanged with the amplitude $I_g$. The secondary currents $i_k$ and $i_2$ of the transformer fall at approximately the same rate.

In the fifth stage of the rectification mode, namely stage 5, as shown in FIG. 7, the second switch tube $S_2$, the third switch tube $S_3$, the sixth switch tube $S_6$, the seventh switch tube $S_7$ and the ninth switch tube $S_9$ are in a conducting state, and the first switch tube $S_1$, the fourth switch tube $S_4$, the fifth switch tube $S_5$, the eighth switch tube $S_8$, and the tenth switch tube $S_{10}$ are in the off state, which corresponds to the stage V of FIG. 2b. The potential difference $u_{ab}$ at the midpoint of the bridge arm of the first full-bridge circuit unit 300 is equal to $-u_{cc}$, and the potential difference $u_{cd}$ at the midpoint of the bridge arm of the second full-bridge circuit unit 500 is equal to zero. The current $i_1$ of the first phase-shift inductor L1 increases linearly with the rate of $$\frac{u_{cc}}{L_p};$$

the current $i_2$ of the second phase-shift inductor L2 decreases linearly with the rate of $$-\frac{u_{cc}}{L_p}.$$

The AC terminal current $i_g$ is equal to the sum of the currents $i_1$ and $i_2$, and the current $i_1$ rises at approximately the same rate as the current $i_2$ falls, so the AC terminal current $i_g$ approximately keeps unchanged with the amplitude $I_g$. The secondary currents $i_k$ and $i_2$ of the transformer fall at approximately the same rate.

In the sixth stage of the rectification mode, namely stage 6, as shown in FIG. 8, the second switch tube $S_2$, the third switch tube $S_3$, the sixth switch tube $S_6$, the eighth switch tube $S_8$ and the ninth switch tube $S_9$ are in the conducting state, and the first switch tube $S_1$, the fourth switch tube $S_4$, the fifth switch tube $S_5$, the seventh switch tube $S_7$, and the tenth switch tube $S_{10}$ are in an off state, which corresponds to the stage VI of FIG. 2b. The potential difference $u_{ab}$ at the midpoint of the bridge arm of the first full-bridge circuit unit 300 is equal to $-u_{cc}$, and the potential difference $u_{cd}$ at the midpoint of the bridge arm of the second full-bridge circuit unit 500 is equal to zero. The current $i_1$ of the first phase-shift inductor L1 decreases linearly with a rate of $$\frac{u_{cc} - V_b}{2L_p};$$

the current $i_2$ of the second phase-shift inductor L2 increases linearly with a rate of $$\frac{-u_{cc} + V_b}{2L_p}.$$

The AC terminal current $i_g$ is equal to the sum of currents $i_1$ and $i_2$, and the current $i_1$ rises at approximately the same rate as the current $i_2$ falls, so the AC terminal current $i_g$ approximately keeps unchanged with the amplitude $I_g$. The secondary currents $i_k$ and $i_2$ of the transformer fall at approximately the same rate.

In a control method of a single-stage isolated bidirectional converter described in an embodiment of the disclosure, after a rectification or inverter control command is received, a corresponding driving signal with duty ratio of 50% is sent to the driving terminals of the first to the tenth switch tubes to control only one of the two switch tubes in the same bridge arm in the first full-bridge circuit unit to be in a conducting state, to control only one of the two switch tubes in the half-bridge circuit unit to be in a conducting state, and to control only one of the two switch tubes in the same bridge arm in the second full-bridge circuit unit to be in a conducting state, so that the single-stage isolated bidirectional converter operates in the rectification mode or the inverter mode. Based on the above, the single-stage isolated bidirectional converter of the present disclosure includes only one stage of power conversion, so the loss of the converter is small and the conversion efficiency is high. Moreover, the single-stage isolated bidirectional converter of the present disclosure includes only filter capacitor with small capacitance, and does not need to use the bus capacitor with large capacitance as an energy buffer unit. Accordingly, the converter is small in size and has a long service life. Furthermore, the single-stage isolated bidirectional converter of the present disclosure does not need a boost inductor, that is, the topology does not have the characteristics of a boost inductor. Therefore, the size and magnetic loss of the converter are reduced, and the cost of the converter is lowered.

In the description of the present disclosure, the terms "first" and "second" are only used for the purpose of description, and cannot be understood as indicating or implying relative importance or implying the number of indicated technical features. Thus, a feature defined as "first" or "second" may explicitly or implicitly include one or more of that feature. "Plurality" means two or more, unless expressly specifically limited otherwise.

In the present disclosure, unless otherwise expressly specified and limited, the terms "installed", "connected", "linked", "fixed" and other terms should be understood in a broad sense, for example, the above terms may refer to a fixed connection or a detachable connection, or integrated; the above terms may refer to a mechanical connection or an electrical connection; the above terms may refer to a direct connection or an indirect connection through an intermediate medium, and the above terms may refer to the internal connection of the two elements or the interaction relationship between the two elements. For those of ordinary skill in the art, the specific meanings of the above terms in the present disclosure can be understood according to specific situations.

In the present disclosure, unless otherwise expressly specified and limited, a first feature being "on" or "under" a second feature may refer to a direct contact between the first and second features, or the first and second features are in indirect contact through an intermediate medium. Also, the first feature being "above", "over" and "on" the second feature may mean that the first feature is directly above or obliquely above the second feature, or simply means that the first feature is at a level higher than the second feature. The first feature being "below", "under" and "beneath" the second feature may mean that the first feature is directly below or obliquely below the second feature, or simply means that the first feature is at a level lower than the second feature.

In the description of this specification, description with reference to the terms "one embodiment," "some embodiments," "example," "specific example," or "some examples", etc., mean specific features, structures, materials or characteristics described in connection with the embodiment or example are included in at least one embodiment or example of the present disclosure. In this specification, schematic expression of the above terms are not necessarily directed to the same embodiment or example. Furthermore, the particular features, structures, materials or characteristics described may be combined in any suitable manner in any one or more embodiments or examples. Additionally, those skilled in the art may combine and merge the different embodiments or examples described in this specification, as well as the features of the different embodiments or examples, without conflicting each other.

It should be understood that various parts of the present disclosure may be implemented in hardware, software, firmware or a combination thereof. In the above-described embodiments, various steps or methods may be implemented in software or firmware stored in memory and executed by a suitable instruction execution system. For example, if implemented in hardware, as in another embodiment, it can be implemented by any one or a combination of the following techniques known in the art: discrete logic circuits with logic gates for implementing logic functions on data signals, ASICs with suitable combinational logic gates, Programmable Gate Arrays (PGA), Field Programmable Gate Arrays (FPGA), etc.

Those of ordinary skill in the art can understand that all or part of the steps carried by the methods of the above embodiments can be completed by instructing the relevant hardware through a program, and the program can be stored in a computer-readable storage medium. When the program is executed, one or a combination of the steps of the method embodiment is involved.

In addition, each functional unit in each embodiment of the present disclosure may be integrated into one processing module, or each unit may exist physically alone, or two or more units may be integrated into one module. The above-mentioned integrated modules can be implemented in the form of hardware, and can also be implemented in the form of software function modules. If the integrated modules are implemented in the form of software functional modules and sold or used as independent products, they may also be stored in a computer-readable storage medium.

The above-mentioned storage medium may be a read-only memory, a magnetic disk or an optical disk, and the like. Although the embodiments of the present disclosure have been shown and described above, it should be understood that the above-mentioned embodiments are exemplary and should not be construed as limiting the present disclosure. Variations, modifications, substitutions, and alterations to the above-described embodiments can be made by those of ordinary skill in the art within the scope of the present disclosure.

What is claimed is:

1. A single-stage isolated bidirectional converter, comprising: a DC voltage port, an AC voltage port, a first full-bridge circuit unit, a half-bridge circuit unit, a second full-bridge circuit unit, a phase-shift unit, a transformer and a filter capacitor, wherein
the AC voltage port comprises a first port and a second port;
the DC voltage port comprises a third port and a fourth port;
the transformer comprises a first winding and a second winding, and the first winding is provided with a center tap, the center tap is connected with the first port, two ends of the first winding are connected with midpoints of two bridge arms of the first full-bridge circuit unit through the phase-shift unit respectively, and two ends of the second winding are connected with midpoints of two bridge arms of the second full-bridge circuit unit respectively;
two ends of the first full-bridge circuit unit are respectively connected with two ends of the half-bridge circuit unit;
the two ends of the half-bridge circuit unit are further connected with two ends of the filter capacitor, and a midpoint of a bridge arm of the half-bridge circuit unit is connected with the second port;
two ends of the second full-bridge circuit unit are respectively connected with the third port and the fourth port.

2. The single-stage isolated bidirectional converter according to claim 1, wherein the first full-bridge circuit unit comprises:
a first switch tube and a second switch tube connected in series, wherein a first end of the first switch tube is connected to a first end of the second switch tube, and a connection point between the first switch tube and the second switch tube is one of the midpoints of the two bridge arms of the first full-bridge circuit unit;
a third switch tube and a fourth switch tube connected in series, wherein a first end of the third switch tube is connected with a first end of the fourth switch tube, and a connection point between the third switch tube and the fourth switch tube is the other one of the midpoints of the two bridge arms of the first full-bridge circuit unit, a second end of the third switch tube is connected to a second end of the first switch tube, and a second end of the fourth switch tube is connected to a second end of the second switch tube.

3. The single-stage isolated bidirectional converter according to claim 2, wherein the half-bridge circuit unit comprises:
a fifth switch tube and a sixth switch tube connected in series, wherein a first end of the fifth switch tube is connected to a first end of the sixth switch tube, and a connection point between the fifth switch tube and the sixth switch tube is the midpoint of the bridge arm of the half-bridge circuit unit; a second end of the fifth switch tube is connected with a second end of the third switch tube, and a second end of the six switch tube is connected to a second end of the fourth switch tube.

4. The single-stage isolated bidirectional converter according to claim 3, wherein the phase-shift unit comprises:
a first phase-shift inductor, wherein one end of the first phase-shift inductor is connected to the one of the midpoints of the two bridge arms of the first full-bridge circuit unit, and the other end of the first phase-shift inductor is connected to one of the two ends of the first winding;
a second phase-shift inductor, wherein one end of the second phase-shift inductor is connected to the other one of the midpoints of the two bridge arms of the first full-bridge circuit unit, and the other end of the second phase-shift inductor is connected to the other one of the two ends of the first winding.

5. The single-stage isolated bidirectional converter according to claim 4, wherein the second full-bridge circuit unit comprises:
a seventh switch tube and an eighth switch tube connected in series, wherein a first end of the seventh switch tube is connected to a first end of the eighth switch tube, and a connection point between the seventh switch tube and the eighth switch tube is one of the midpoints of the two bridge arms of the second full-bridge circuit unit;
a ninth switch tube and a tenth switch tube connected in series, wherein a first end of the ninth switch tube is connected to a first end of the tenth switch tube, and a connection point between the ninth switch tube and the tenth switch tube is the other one of the midpoints of the two bridge arms of the second full-bridge circuit unit; a second end of the ninth switch tube is connected to a second end of the seventh switch tube, and a second end of the tenth switch tube is connected to a second end of the eighth switch tube.

6. A control method of the single-stage isolated bidirectional converter according to claim 5, comprising the following steps:

after a rectification command or an inverter control command is received, a corresponding driving signal with a duty ratio of 50% is sent to driving terminals of the first to the tenth switch tubes to control only one of the two switch tubes in the same bridge arm in the first full-bridge circuit unit to be in a conducting state, to control only one of the two switch tubes in the half-bridge circuit unit to be in the conducting state, and to control only one of the two switch tubes in the same bridge arm in the second full-bridge circuit unit to be in the conducting state, so that the single-stage isolated bidirectional converter operates in a rectification mode or an inverter mode, wherein when the single-stage isolated bidirectional converter operates in the rectification mode, a driving signal corresponding to the first full-bridge circuit unit is precedent to a driving signal corresponding to the second full-bridge circuit unit; when the single-stage isolated bidirectional converter operates in the inverter mode, the driving signal corresponding to the first full-bridge circuit unit lags behind the driving signal corresponding to the second full-bridge circuit unit.

* * * * *